Figure 10:
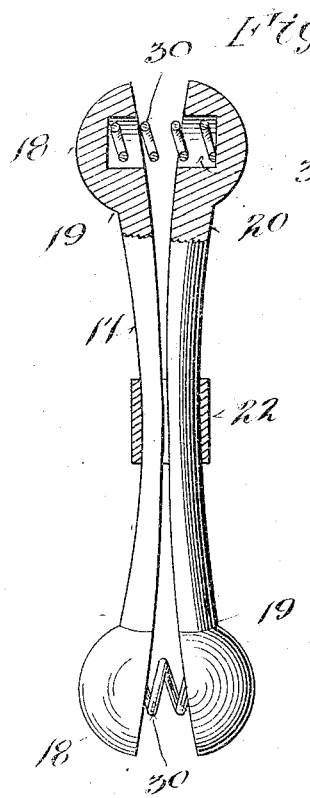

No. 817,871. PATENTED APR. 17, 1906.
C. K. PICKLES.
BRAKE HANGER.
APPLICATION FILED JUNE 14, 1905.
3 SHEETS—SHEET 1.
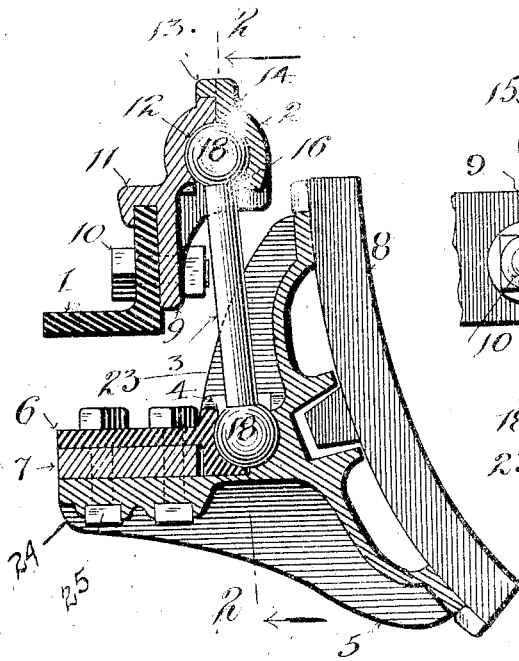
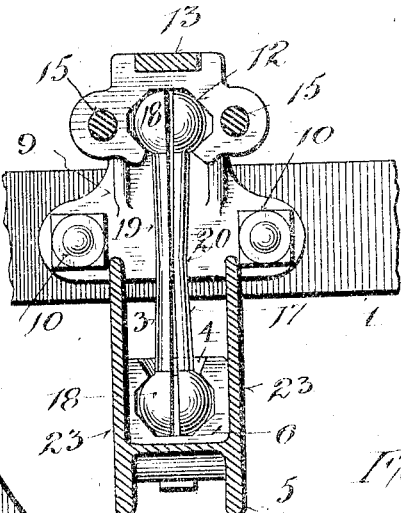
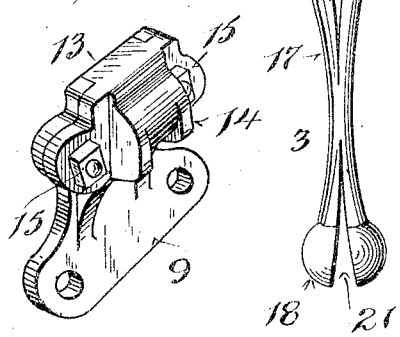
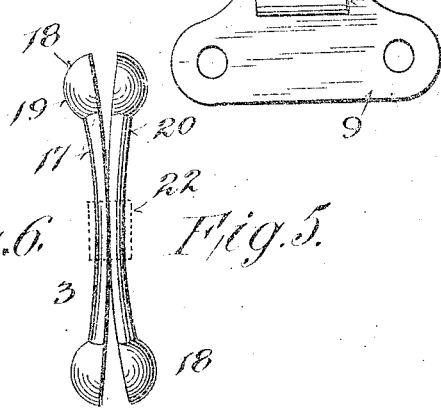
Witnesses
C. W. Benjamin
Chas. G. Hensley
Inventor
Chas. K. Pickles
By his Attorney
Joseph L. Levy No. 817,871. PATENTED APR. 17, 1906.
C. K. PICKLES.
BRAKE HANGER.
APPLICATION FILED JUNE 14, 1905.

3 SHEETS—SHEET 2.

Witnesses
C. W. Berg
Chas. G. Hensley

Inventor
Chas. K. Pickles.
By his Attorney
Joseph L. Levy

No. 817,871. PATENTED APR. 17, 1906.
C. K. PICKLES.
BRAKE HANGER.
APPLICATION FILED JUNE 14, 1905.
3 SHEETS—SHEET 3.
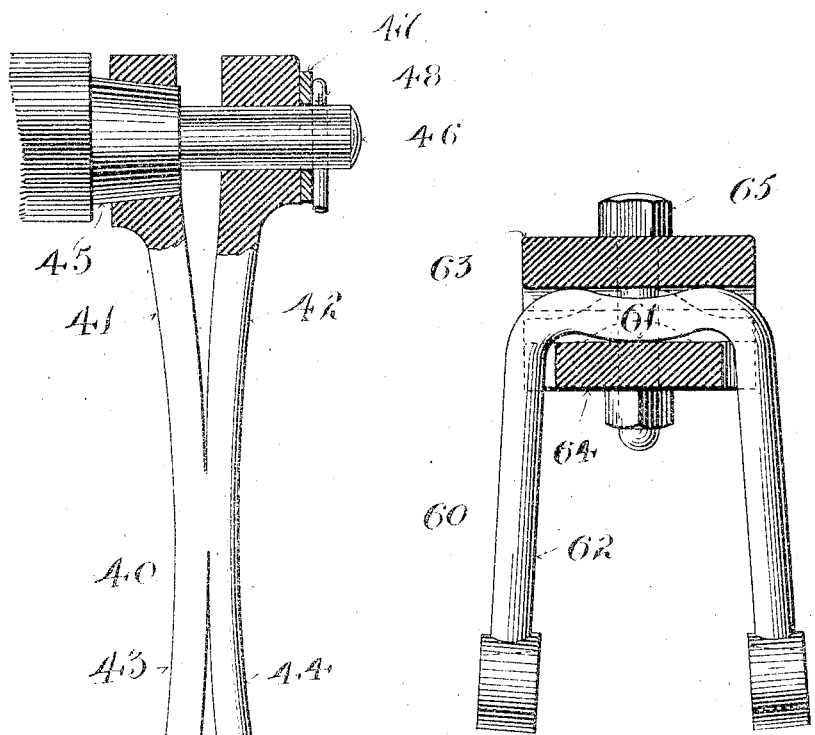
Fig. 11.    Fig. 12.
Witnesses
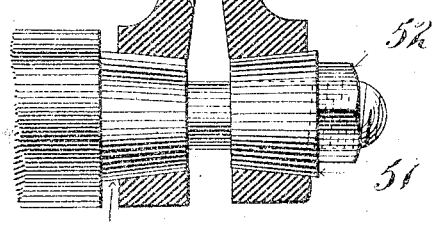
Inventor
Charles K. Pickles.
By his Attorney

UNITED STATES PATENT OFFICE.

CHARLES K. PICKLES, OF PHILADELPHIA, PENNSYLVANIA, ASSIGNOR TO JOHN A. BRILL, OF PHILADELPHIA, PENNSYLVANIA.

BRAKE-HANGER.

No. 817,871.

Specification of Letters Patent.

Patented April 17, 1906.

Application filed June 14, 1905. Serial No. 265,132.

*To all whom it may concern:*

Be it known that I, CHARLES K. PICKLES, a citizen of the United States, and a resident of the city of Philadelphia, county of Philadelphia, and State of Pennsylvania, have invented a new and useful Improvement in Brake-Hangers, of which the following is a specification.

The object of my invention is to improve articles of this class, so that all adjustments necessary to compensate for wear will be automatically taken up, whereby the hanger will require no attention and will never chatter or rattle. This object is accomplished by my invention, certain embodiments of which are hereinafter set forth.

For a more particular description of my invention reference is to be had to the accompanying drawings, forming a part hereof, in which—

Figure 1 is a sectional view showing my improved hanger in place. Fig. 2 is a sectional view taken on the line 2 2 of Fig. 1 looking in the direction of the arrows. Figs. 3 and 4 are views of the socket which is attached to a truck-frame. Figs. 5 to 12 show modified forms of hangers.

Throughout the various views similar reference characters designate similar parts.

The truck-frame 1 has bolted to it the socket 2, in which rests the hanger 3, which engages a second socket 4, formed between the brake-head 5 and a piece 6, bolted to a brake-beam 7. The brake-shoe 8 is held on the head 6 in the usual way.

The socket 2 comprises a vertical web 9, which is secured by bolts 10 to the truck-frame 1, and this part of the frame is preferably overlapped by a lip 11. The web 9 is extended upwardly and rearwardly to form the recess 12 to hold half of the upper end of the hanger 3. The upper extremity of this web 9 is recessed to receive a tongue 13 on the other part 14 of the socket, which is bolted to the web 9 by bolts 15 and is recessed at 16 to receive part of the end of the hanger 3. This hanger 3 comprises the shank 17 with knobs or balls which are preferably, but not necessarily, given a spherical shape. The hanger may be formed of two segments 19 and 20, as shown in Figs. 2 and 5, or one which is divided at 21, as shown in Fig. 6. If the structure shown in Figs. 2 and 5 is employed, it is better to unite the segments by an annulus 22, as indicated by dotted lines on Fig. 5. In any case the hanger 3 is made so that the balls 18 are sprung apart because of the resilient nature of the shank 17, so that the sockets 2 and 4 are always fitted by these balls 18 at the proper tension, so that at all times the compensations for wear are accurately made.

The head 5 is provided with vertical webs 23 and a horizontal web 24, which is bolted to the beam 7 by means of bolts 25, which also hold the piece 6 in place.

When the elements are assembled, the parts of the balls 18 are preferably clamped together or nearly together by suitable removable clamps on the shank 17. When in position in their sockets, these clamps are removed and the hanger 3 then automatically assumes its proper position above described.

If a more positive action of the hangers is desired, it may be had by one of the means shown in Figs. 7 to 10, inclusive.

Figure 8:
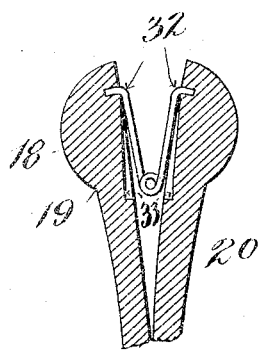

In Figs. 10 and 8 the segments are separated by springs. Coiled springs 30 in recesses 31 are shown in Fig. 10 and leaf-springs 32 in recesses 33 in Fig. 8.

Figure 7:
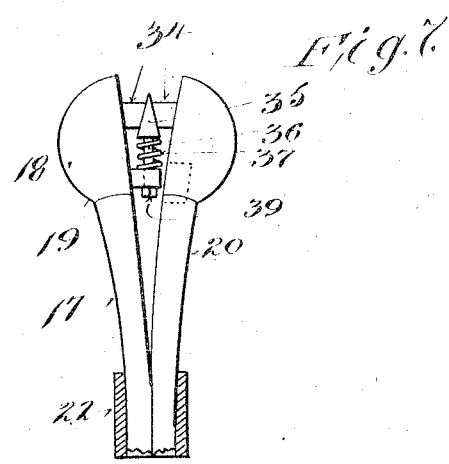
Figure 9:
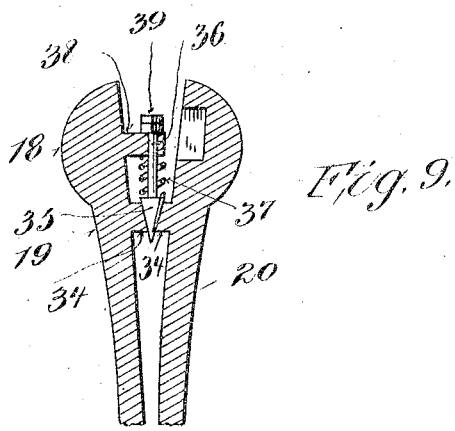

In Figs. 7 and 9 the parts 19 and 20 are provided with cams 34, a wedge 35, a spindle 36, extending axially therefrom, a spring 37, surrounding said spindle, and a lug 38 on the part 19, through which the spindle extends. A nut or nuts 39 limit the movement of the wedge 35 and the separation of the parts 19 and 20 under the action of the spring 37. In Figs. 7 and 9 the wedges and cams are shown in opposite direction; but as the functions are identical in either case one description answers for both.

In Figs. 7 to 10 only one end of the hanger is shown, the other being identical, so further description is unnecessary.

Another form of automatic brake-hanger is shown in Fig. 11. In this embodiment the hanger 40 is preferably split throughout its entire length except at the center, whereby the spring-arms 41, 42, 43, and 44 are formed. The arm 41 has a conical perforation which fits a similarly-shaped stud 45, which is suitably mounted on the truck-frame. This stud 45 is also provided with a cylindrical part 46, which fits a bore in the arm 42. A washer 47 and cotter-pin 48 hold these parts together.

This structure may be applied to each end of the hanger, although preferably I employ arms 43 and 44, which are substantially identical with the arm 41, and the pin 49 is provided with the integral cone 50 and the non-rotatably-mounted cone 51, which is held in place by a nut 52 in the usual way. In this form of my invention the wear is automatically taken up by the coned arms rising on the cones under the spring action of the arms.

Yet another form of my invention is found disclosed in Fig. 12, in which the hanger 60 is substantially U-shaped, its central upper portion 61 being depressed. The arms 62 of this hanger 60 are slightly enlarged and provided with conical bores which are adapted to receive similarly-shaped and rigid lugs on the brake-beam or hanger. The truck-frame is provided with jaws 63 and 64, one of which is adjustably mounted with regard to the other, and they are brought together and against the hanger 60 by means of a bolt 65. The recess in which the hanger 60 rests is so shaped as to permit a slight turning movement. By tightening the bolt 65 the part 61 of the hanger 60 is somewhat straightened, thereby causing the free ends of the arms 62 to be brought together, whereby any wear may be readily taken up with one adjustment.

From the foregoing my invention will be readily understood. I do not, however, regard it as restricted to the precise features herein described, as it may be varied in many details without change of substance. I regard its scope as defined by the annexed claims.

What I claim is—

1. In a device of the class described, a socket, fixed to a truck-frame, a socket secured to the brake beam or head, and a hanger having resilient ends which fit said sockets.

2. In a device of the class described, a socket secured to a truck-frame, a socket secured to a brake beam or head, and hanger having resilient ball-heads fitting in said sockets.

3. In a device of the class described, a socket secured to a truck-frame, a socket secured to a brake beam or head, and a hanger formed of two resilient parts with enlarged heads fitting said sockets, and means for holding said parts together.

4. In a device of the class described, a socket secured to a truck-frame, a second socket formed in a brake-head and a piece secured to a brake-beam and a hanger with enlarged ends resting in said sockets.

5. In a device of the class described, a brake-hanger comprising a shank with divided heads, and springs for causing a separation of said heads.

6. In a device of the class described, a brake-hanger comprising a shank with a divided head, cams, and a spring-actuated wedge for separating the parts of said head.

Signed this 28th day of April, 1905.

CHARLES K. PICKLES.

Witnesses:
C. M. COLHOUN,
F. C. BRINDLEY.